Patented June 6, 1939

2,161,186

UNITED STATES PATENT OFFICE 2,161,186

INSULATING MATERIAL AND PROCESS OF MANUFACTURE

John D. Morgan, South Orange, N. J., and Russell E. Lowe, New York, N. Y., assignors to Power Patents Company, Hillside, N. J., a corporation of Maine No Drawing. Application September 15, 1936, Serial No. 100,802

9 Claims. (Cl. 106—18)

The present invention relates to heat insulation and more particularly to a new light weight heat insulating material and process of manufacturing the same.

The primary object of the invention is to provide a light weight porous heat insulating material which will withstand temperatures above 2500° F. without deterioration. Other objects of the invention are: to provide a heat insulating material which will not deteriorate when exposed to moisture and which possesses sufficient strength to withstand mechanical handling; and to provide heat insulating material which can be made up with suitable bonding agents into bricks or other shapes which do not shrink or warp considerably when fired or used at high temperatures.

With the above and other objects and features in view the invention consists in the improved heat insulating material and process of manufacture as hereinafter described and more particularly defined by the accompanying claims.

The base material which is used in the manufacture of the heat insulator which forms the subject of the present invention is granular silica hydrogel. The preferred base material is a granular silica hydrogel containing approximately ½% by weight of a salt impurity such as sodium chloride or sodium phosphate. The usual method of manufacturing such silica hydrogel is by reacting water glass with a dilute solution of a mineral acid such as hydrochloric acid or phosphoric acid. Thus by adding a 10% solution of hydrochloric acid to an equal volume of sodium silicate solution of about 1.1 to 1.3 gravity with vigorous agitation, and allowing the solution to stand for a few hours, a gel is formed which is homogeneous in character and which contains a certain amount of sodium chloride as an impurity. The setting of the reaction mixture to a gel can be hastened by elevating the temperature of the mixture to about 120° F., or by adding to the reaction mixture a small amount of ammonium chloride. The gel is a concentrated colloidal solution of silicic acid. After hardening, the gel is broken up and washed with warm water in order to remove excess impurities and reduce the amount of sodium chloride impurity to about ½%. The gel is then gradually dehydrated by slow heating to a temperature of about 240° F., after which the temperature is raised to 400° to 600° F. in order to bake the gel and reduce its combined water content to that normally present in commercial silica hydrogel. This baked silica hydrogel is glassy and granular in structure.

The method of preparing the light weight insulating material of the present invention is to crush the granular silica hydrogel to a size which will pass a screen of ten meshes to the linear inch. The crushed and screened hydrogel product is then placed in shallow layers in trays which are inserted into a furnace operated at a temperature of approximately 2400° F. by this operation the fine grains of silica hydrogel are rapidly heated to approximately the furnace temperature, and the individual grains are thereby puffed or enlarged to several times their original size, apparently as a result of the rapid liberation of the combined water of the hydrogel. Each individual fine grain of hydrogel is thereby converted into an extremely porous silica ball or pellet which has a hard, tough surface and extremely porous structure throughout. No substantial puffing action takes place unless the hydrogel is heated to a temperature of 2200°–2400° F.

The pellets or balls of substantially anhydrous silica which are produced by this rapid high temperature heat treatment are very strong and will withstand ordinary mechanical handling without breakage and wastage. They will also withstand without fusion temperatures of the order of 3000° F. The small amount of impurity which is present in the original granular silica hydrogel apparently plays an active part in the puffing action which occurs during the rapid high temperature heat treatment, because pellets which are produced from a hydrogel containing say ½% sodium chloride or solid phosphate have a somewhat lighter density and greater porosity than pellets which are made from a purer hydrogel base. The pellets manufactured as described from a hydrogel containing about ½% of salt impurity have an apparent density as compared with water of about 0.4.

The product which is produced as described has very excellent heat insulating properties and can be readily made up into bricks or other structural forms suitable for use in furnace walls by bonding an aggregate of the pellets with a small amount of plastic clay such as ball clay or china clay wetted with phosphoric acid. A brick molded from an aggregate of the pellets bonded with phosphoric acid wetted plastic clay can be formed to approximately the desired finished dimensions and will not shrink or warp appreciably when fired to temperatures above 2500° F. Bricks thus prepared will withstand rapid changes of temperature without disintegration, and will also withstand temperatures of the order of 2700° F. without fusion. The bricks thus prepared have a lower thermal conductivity than any other insulating bricks now on the market. An insulating brick of standard size prepared as described will have a weight of approximately one pound as compared to a weight of 2½ to 3½ pounds possessed by available types of insulating bricks of the same size. A heavier brick of higher thermal conductivity but even greater mechanical strength can be prepared from the puffed silica pellets by bonding with about 30 to 40% by volume of zirconium silicate wetted with about 6% by weight of phosphoric acid.

The invention having been thus described, what is claimed as new is:

1. The process of preparing a light weight porous silica heat insulator which comprises crushing granular silica hydrogel to a size which will pass a screen of about ten meshes to the linear inch, and heating the crushed hydrogel in thin layers to a temperature of about 2400° F., thereby producing enlarged porous silica pellets having an apparent density of about 0.4.

2. The process of preparing a hard porous silica insular which comprises preparing granular silica hydrogel so as to incorporate therewith about ½% of alkali salt impurity, crushing the granular gel and screening the crushed product, and rapidly heating the crushed and screened silica gel in thin layers to a temperature of about 2200° to 2400° F.

3. The method of preparing a light weight insulating brick which comprises crushing granular silica hydrogel, heating the crushed gel in thin layers to a temperature of about 2400° F. to produce porous silica pellets, and bonding and molding an aggregate of the silica pellets into a light weight insulating brick.

4. The process of preparing a hard porous silica insulator which comprises preparing granular silica hydrogel, and rapidly heating the hydrogel to a relatively high temperature thereby producing substantially anhydrous enlarged porous silica pellets.

5. The process of producing a hard porous silica insulator which comprises preparing granular silica hydrogel, incorporating therewith a relatively small proportion of an alkali salt impurity and rapidly heating the hydrogel to a relatively high temperature thereby producing substantially anhydrous silica pellets.

6. The process of producing a hard porous silica insulator which comprises preparing granular silica hydrogel, and rapidly heating the hydrogel to a temperature of from 2200° to 2400° F. thereby producing enlarged porous silica pellets.

7. An insulating material comprising hard silica pellets having an apparent density of about 0.4 and consisting of heat expanded and substantially dehydrated silica hydrogel, said pellets being bonded with about one third their volume of zirconium silicate.

8. A bonded insulating material comprising preformed hard silica pellets having a high degree of porosity, said pellets being bonded together with a bonding agent and cast in the desired shape.

9. In the process of making a light weight refractory product from silica hydrogel, the improvement which comprises preparing granular particles of silica hydrogel, rapidly heating the silica hydrogel particles to a high temperature thereby converting said particles into substantially enlarged porous silica pellets, and bonding said pellets together with a bonding agent to form said light weight refractory product.

JOHN D. MORGAN.
RUSSELL E. LOWE.